US006867819B2

(12) United States Patent
Lee

(10) Patent No.: US 6,867,819 B2
(45) Date of Patent: Mar. 15, 2005

(54) DIGITAL TELEVISION RECEIVER AND ANTENNA CONTROL METHOD THEREIN

(75) Inventor: Tae Won Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 714 days.

(21) Appl. No.: 09/955,931

(22) Filed: Sep. 20, 2001

(65) Prior Publication Data

US 2002/0036718 A1 Mar. 28, 2002

(30) Foreign Application Priority Data

Sep. 27, 2000 (KR) .......................................... 2000-56616

(51) Int. Cl.[7] ................................................ H04N 5/44
(52) U.S. Cl. ........................ 348/725; 348/727; 348/731; 725/72
(58) Field of Search ................................. 348/725, 727, 348/731–733, 726, 728; 455/276.1, 277.1, 277.2, 278.1, 562.1, 101; 375/267, 256, 259, 299, 347; 725/72

(56) References Cited

U.S. PATENT DOCUMENTS

| | | | | |
|---|---|---|---|---|
| 5,797,083 A | * | 8/1998 | Anderson | .................... 455/25 |
| 6,009,124 A | * | 12/1999 | Smith et al. | ................. 375/267 |
| 6,334,218 B1 | * | 12/2001 | Jeong et al. | ................... 725/72 |
| 6,549,754 B1 | * | 4/2003 | Miller et al. | ............... 455/3.02 |
| 6,661,373 B1 | * | 12/2003 | Holliday | ..................... 342/359 |

* cited by examiner

Primary Examiner—John Miller
Assistant Examiner—Trang U. Tran
(74) Attorney, Agent, or Firm—Birch, Stewart, Kolasch & Birch, LLP

(57) ABSTRACT

A digital television receiver and antenna control method in the digital television receiver are disclosed. The digital television receiver includes and antenna having directivity according to a control signal for switching patterns of the antenna. A receiving section receives and processes channel signals for digital television broadcasting through the antenna. An antenna control section generates the control signal for switching the patterns of the antenna based on channel information according to the received channel signal. An antenna switching control section switches the patterns of the antenna during a sync signal period of the received channel signal when the control signal is generated.

17 Claims, 9 Drawing Sheets

Multi-path ghost — Omni-directional antenna — Main signal path

Multi-path ghost — Directional antenna — Main signal path

Multi-path ghost — Smart antenna — Main signal path

DIGITAL TELEVISION RECEIVER AND ANTENNA CONTROL METHOD THEREIN

BACKGROUND OF THE INVENTION

1. Field of the Invention

The present invention relates to a digital television receiver and an antenna control method in a digital television receiver.

2. Background of the Related Art

Researches for an antenna of a vestigial side band (VSB) modulation receiver selected as the standard of transmission type of a terrestrial channel for digital television broadcasting are still in their early stages and incomplete, but recently, the concepts and ideas thereof have been gradually proposed. Also, it is known that their standardization is now preparing in ATSC.

However, at present, any case of an antenna applied to a digital television receiver has not yet been open to the public and has not yet been commercialized.

The conventional antenna that can be used in the digital television receiver is briefly classified into two types.

One is an outdoor antenna. This outdoor antenna has a good receiving performance, but is large-sized and causes inconvenience in installation.

The other is an indoor antenna. This indoor antenna is small-sized and can be easily installed. However, it has a disadvantage that when the receiving sensitivity is lowered during viewing of a television broadcast, a user should manually adjust the directivity of the antenna as he/she is monitoring a displayed picture.

Meanwhile, in the terrestrial channel of the digital television broadcasting, many multi-paths and radio wave obstacles may exist. Thus, the receiving characteristic of the antenna of the digital television receiver may greatly affect the characteristic of the digital television receiver.

Hereinafter, problems of antennas according to their kinds and channel environments will be explained with reference to FIGS. 1 to 3.

FIG. 1 is a diagram illustrating an omni-directional antenna, FIG. 2 is a diagram illustrating a directional antenna, and FIG. 3 is a diagram illustrating a smart antenna.

First, the digital television receiver using the omni-directional antenna of FIG. 1 can receive a main signal in all directions only in channels wherein the main signal is strong and multi-path signals are weak. On the contrary, in the channels wherein the main signal is weak and the multi-path signals are strong such as downtown building areas or indoor antennas, it is not easy for the omni-directional antenna to receive a desired channel, and this deteriorates the performance of the digital television receiver.

Second, in order to solve the problem of the omni-directional antenna, the use of the directional antenna of FIG. 3 may be considered. However, under the environment where the channel state is continuously changed, the main signal may be intercepted by moving radio wave obstacles. In this case, it is not easy to receive the main signal in other directions, and this also deteriorates the performance of the digital television receiver. As described above, the omni-directional antenna and the directional antenna are in a mutual trade-off relation.

Third, in order to solve the problems of the omni-directional antenna and the directional antenna, the use of the smart antenna of FIG. 3 may be considered. The adoption of the smart antenna can solve the above-described problems, but the smart antenna should accompany an antenna control section that can effectively control the pattern and directivity of the smart antenna.

The smart antenna that can be applied to the digital television antenna may be classified into a phase array type, motor drive type, switching type, etc.

According to the phase array type and motor drive type, antenna patterns of the antenna are continuously provided. According to the switching type, N antenna patterns are switched as needed, and the signal is interrupted during the switching operation. This may exert a bad effect on various feedback loops in the digital television receiver.

In the terrestrial channels of the digital television broadcasting, a large number of multi-paths and radio wave obstacles exist. In case that the radio wave obstacle is static, the state of the antenna (i.e., beam width, direction, gain, pattern, etc. of the antenna) can be determined by monitoring the channel environment only once using the smart antenna.

In case that the radio wave obstacle is dynamic, the channel environment is also changed dynamically in process of time, and thus the state of the antenna should be also changed in conformity to the change of the channel environment.

However, while the antenna switching is performed, the digital television receiver cannot receive the signal. While the signal is not received, various feedback loops such as an automatic gain control loop, various kinds of sync signal recovery loop, symbol sync recovery loop, carrier recovery loop, equalizer, etc. constructed in the digital television receiver unconverge, or lock loops are unlocked. Consequently, the digital television receiver should converge or be initialized.

Such an abnormal state of the digital television receiver causes the displayed picture to be broken or frozen until the digital television receiver is in a normal state again, giving the user inconvenience.

SUMMARY OF THE INVENTION

Accordingly, the present invention is directed to a digital television receiver and antenna control method in a digital television receiver that substantially obviates one or more problems due to limitations and disadvantages of the related art.

An object of the present invention is to provide a digital television receiver and antenna control method in a digital television receiver that can prevent discontinuation of received data.

Another object of the present invention is to provide a digital television receiver and antenna control method in a digital television receiver that can prevent an abnormal state of the receiver, and minimize the time required for reaching a normal state of the receiver.

Still another object of the present invention is to provide a digital television receiver and antenna control method in a digital television receiver that can achieve a stable operation of the receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television receiver and antenna control method in a digital television receiver according to the present invention switch an antenna pattern during a sync signal period of a received channel signal.

If the antenna pattern to be switched is similar to the present antenna pattern, the present invention freezes the operation of the receiver during the sync signal period, and switches the antenna pattern.

If the antenna pattern to be switched is not similar to the present antenna pattern, the present invention immediately performs the switching operation without waiting for the sync signal period.

Also, if there is no channel information on the antenna pattern to be switched, the present invention initializes the receiver, while if there is the channel information, the present invention provides the channel information to the receiver.

The channel information on the respective antenna patterns is stored in a storage device, and then the corresponding channel information is provided to the receiver during the switchover to the corresponding antenna pattern.

In one aspect of the present invention, a television receiver includes a receiving section for receiving and processing a channel signal for digital television broadcasting through an antenna having a directivity according to a control signal for switching patterns of the antenna, an antenna control section for generating the control signal for switching the patterns of the antenna based on channel information according to the received channel signal, and an antenna switching control section for switching the patterns of the antenna during a sync signal period of the received channel signal if the control signal is generated.

In another aspect of the present invention, an antenna control method in a digital television receiver includes receiving a channel signal through an antenna as rotating the antenna, storing channel information that corresponds to a pattern of the antenna when the channel signal is received, and switching the pattern of the antenna during a sync signal period of the channel signal if an antenna switching request is received from an antenna control section.

Preferably, the antenna switching control section determines the time point for switching the pattern of the antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
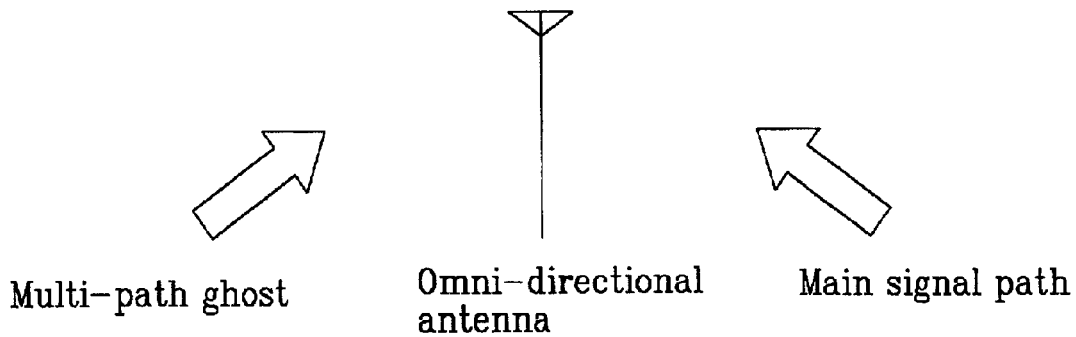
FIG. 1 is a diagram illustrating an omni-directional antenna.
Figure 2:
FIG. 2 is a diagram illustrating a directional antenna.
Figure 3:
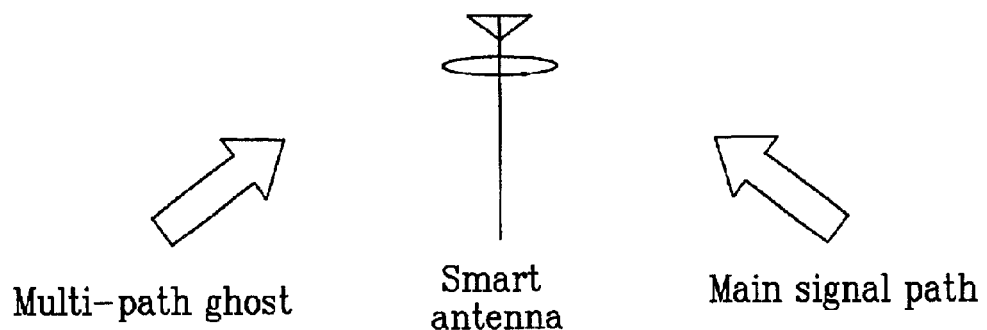
FIG. 3 is a diagram illustrating a smart antenna.
Figure 4A:
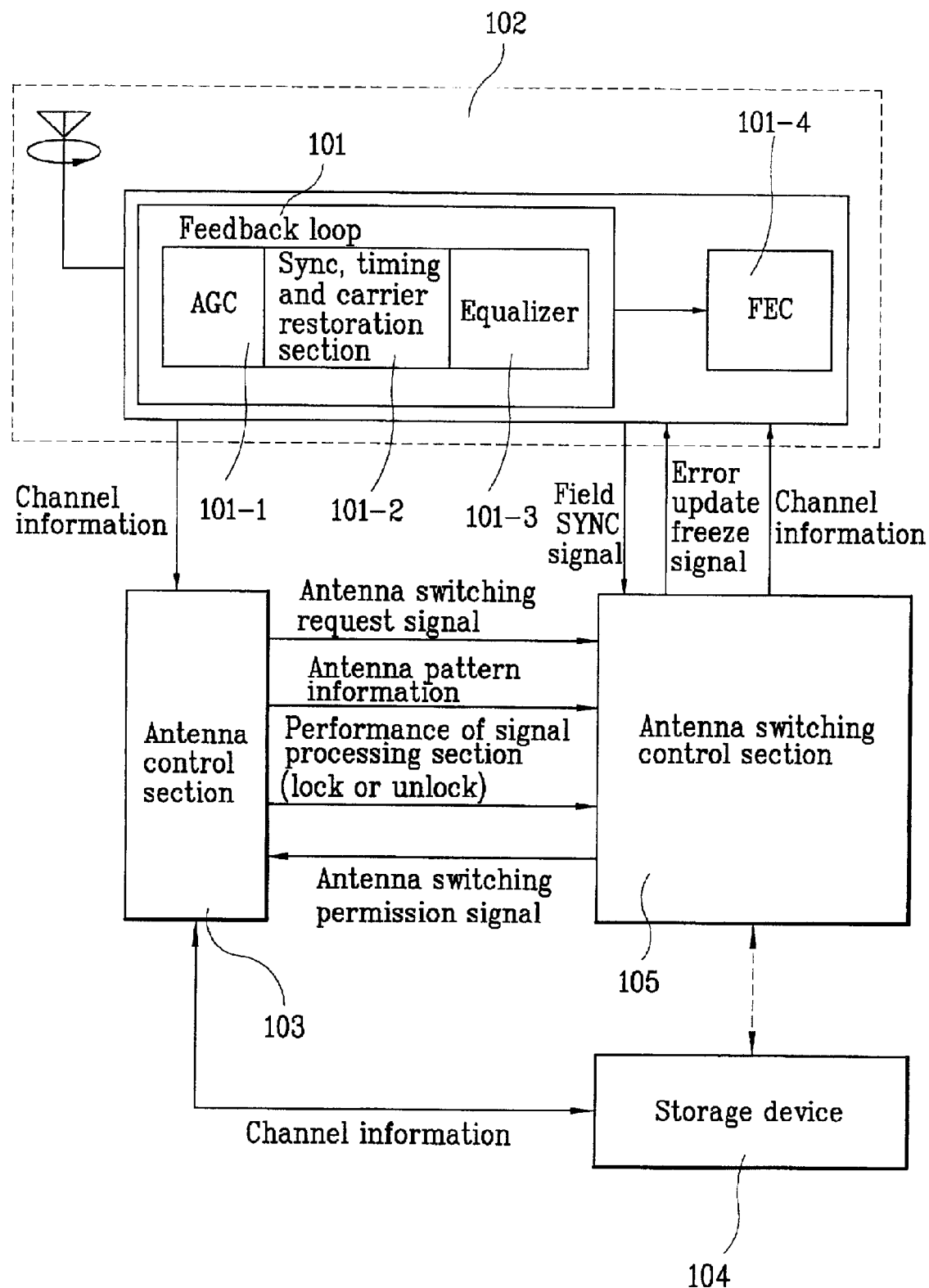
FIG. 4A is a block diagram illustrating the construction of an antenna switching control section and peripheral systems according to the present invention.

FIG. 4A is a block diagram illustrating the construction of an antenna switching control section and peripheral systems according to the present invention.

Referring to FIG. 4A, the digital television receiver according to the present invention includes an antenna 100, a signal processing section 101, an antenna control section 103, an antenna switching control section 105, and a storage device 104.

A channel signal for digital television broadcasting is inputted to the digital television receiver through the antenna 100. In the embodiment of the present invention, a smart antenna is used as the antenna 100. However, another kind of antenna may be also used.

The antenna 100 has the directivity in dependence upon a switching control signal for switching patterns of the antenna.

The signal processing section 101 tunes a desired channel signal among broadcasting channel signals received through the antenna 100, and obtains channel information for switching the patterns of the antenna 100 and video and audio signals for display by processing the tuned channel signal.

As shown in FIG. 4A, the signal processing section 101 includes an automatic gain control section 101-1 for tuning a desired channel signal among broadcasting channel signals received through the antenna 100, and automatically adjusting a gain of the tuned channel signal, a recovery section 101-2 for recovering a synchronization, timing, and carrier loss of the tuned channel signal outputted through the automatic gain control section 101-1, an equalizer 101-3 for equalizing the tuned channel signal outputted from the recovery section 101-2, and a forward error corrector 101-4 for correcting a forward error of the tuned channel signal equalized through the equalizer 101-3.

The equalizer 101-3 is essential to the control of ghost components generated caused by the multi-paths.

The antenna control section 103 receives the channel information from the signal processing section 101, and generates the control signal for switching the patterns of the antenna 100 in response to the received channel information.

Figure 4B:
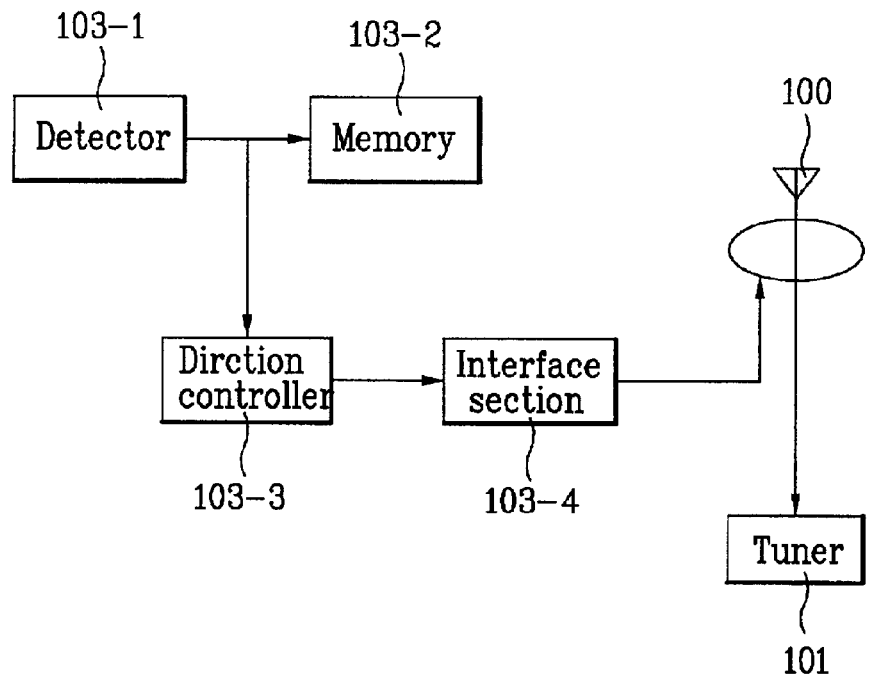
FIG. 4B is a block diagram illustrating the construction of an antenna control section according to the present invention.

FIG. 4B is a block diagram illustrating the construction of the antenna control section 103 in FIG. 4A.

As shown in FIG. 4B, the antenna control section 103 includes a detector 103-1 for obtaining state information such as a power of the tuned channel signal, power of the ghost signal, and signal-to-noise ratio from the channel information provided from the signal processing section 103, a memory 103-2 for storing the state information and updating the stored values by newly detected state information, a direction controller 103-3 for obtaining a direction control signal for controlling a direction of the antenna 100 by comparing the present state information detected by the detector 103-1 with the previous state information stored in the memory 103-2, and an interface section 103-4, connected between the antenna 100 and the tuner 106, for controlling the direction of the antenna 100 according to the direction control signal.

Figure 4C:
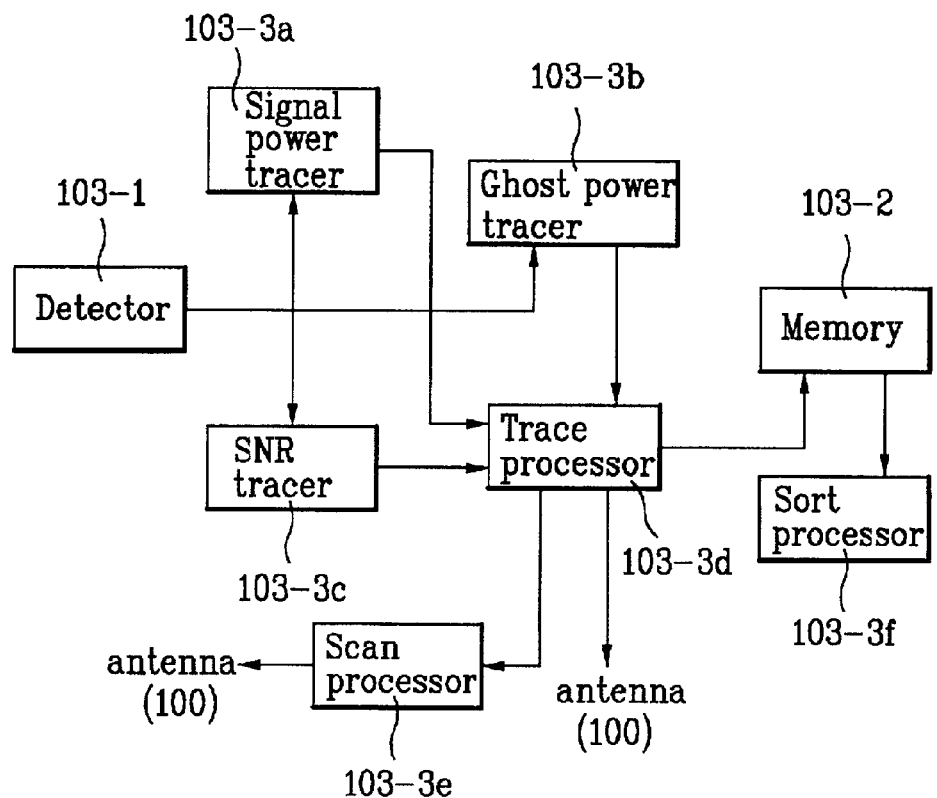
FIG. 4C is a block diagram illustrating the construction of a direction controller according to the present invention.

FIG. 4C is a block diagram illustrating the construction of the direction controller 103-3 in FIG. 4B.

As shown in FIG. 4C, the direction controller 103-3 includes a signal power tracer 103-3a for tracing the power of the tuned channel signal using an output signal of the detector 103-1, a ghost power tracer 103-3b for tracing the power of the ghost signal using the ghost signal from the detector 103-1, a signal-to-noise ratio (SNR) tracer 103-3c for tracing a signal-to-noise ratio (SNR) using the signal-to-noise ratio from the detector 103-1, a trace processor 103-3d for tracing the state information of the tuned channel signal from the currently selected antenna pattern using output signals of the tracers 103-3a to 103-3c, and changing the antenna pattern in the order of antenna patterns stored in the memory 103-2 if the traced state signals do not maintain a value of an effective size, a scan processor 103-3e for obtaining an effective signal power and antenna pattern as changing the directivity of the antenna 100 using the state information from the trace processor 103-3d, and storing values of the obtained signal powers and patterns in the memory 103-2, and a sort processor 103-3f for sorting the antenna pattern values stored in the memory 103-2 in the order corresponding to the signal power values.

Meanwhile, the direction controller 103-3 controls the scan processor 103-3e to perform the scan process if it is judged that no antenna pattern having the effective size is stored in the memory 103-2.

The channel information provided from the signal processing section 101 to the antenna control section 103 to switch the patterns of the antenna 100 includes an automatic control gain, information on various kinds of sync signal restoration, information on symbol sync restoration, information on carrier restoration, equalizer coefficient information, etc.

The antenna control section 103 generates the control signal determined by the power of the channel signal, power of the ghost signal, and state signal such as the SNR signal which are obtained from the channel signal from the signal processing section 101.

Meanwhile, if the control signal is generated from the antenna control section 103, the antenna switching control section 105 switches the patterns of the antenna during the sync signal period of the received channel signal.

Specifically, when the control signal is generated from the signal processing section 101 by the antenna control section 103, the antenna switching control section 105 switches the patterns of the antenna 100 during the sync signal period of the tuned channel signal in response to the antenna-switching-related signals provided from the antenna control section 103.

Meanwhile, as shown in FIG. 4A, the antenna-switching-related signals include the switching request signal for requesting the switching of the patterns of the antenna 100 according to the channel information, state information of the antenna 100 (especially, pattern information of the antenna), system lock signal or system unlock signal as the system performance signal of the signal processing section 101, etc. The pattern information of the antenna includes a switching direction of the antenna 100.

Meanwhile, a storage device 104 stores the channel information for switching the patterns of the antenna 100.

The antenna switching control section 105 provides an antenna switching enable signal to the antenna control section 103 at a time point of the sync signal if the system performance signal of the signal processing section 101 is the system lock signal and the channel information is stored in the storage device 104.

The antenna switching control section 105 provides the antenna switching enable signal directly to the antenna control section 103 if the system performance signal is the system unlock signal and the channel information is not stored in the storage device 104. Here, the sync signal is a field sync signal generated for each field of the tuned channel signal.

If the antenna control section 103 detects the channel information outputted from the signal processing section 101 and generates the control signal for switching the pattern of the antenna in an optimum direction of the antenna 100, the antenna switching control signal 105 judges whether the antenna pattern corresponding to the optimum direction is similar to the present antenna pattern according to the antenna switching request signal inputted from the antenna control section, antenna state information, and system performance signal corresponding to the state information of the signal processing section 101.

If it is judged that the pattern of the antenna 100 corresponding to the optimum direction is similar to the present pattern of the antenna 100, i.e., if the switching direction of the antenna 100 is adjacent to the present direction of the antenna 100, the antenna switching control section switches the pattern of the antenna 100 during the sync signal period of the channel signal received through the antenna 100.

First, the antenna switching control section 105 calculates the sync signal period considering a delay time of the signal processing section 101 of the digital television receiver. That is, it calculates the period where the received channel signal does not exist. Then, the antenna switching control section 105 sends a freeze signal to the signal processing section 101 while it receives the field sync (FSYNC) signal from the signal processing section 101.

In other words, the antenna switching control section 105 send the freeze signal to the signal processing section 101 in order to prevent an abnormal operation of the signal processing section 101 during the switching of the pattern of the antenna 100. Thus, the unfreeze of the feedback loops of the signal processing section 101 is frozen, and the pattern of the antenna 100 is switched.

If the switching of the antenna pattern is completed, the antenna switching control section 105 confirms whether the channel information corresponding to the pattern of the antenna 100, i.e., the channel information on the switching direction of the antenna 100, is stored in the storage device 104. If the channel information is stored in the storage device 104, the antenna switching control section 105 sends an unfreeze signal along with the channel information to the signal processing section 101 to unfreeze the signal processing section 101.

In other words, if the antenna pattern to be switched is similar to the present antenna pattern, that is, if the switching direction of the antenna 100 is very adjacent to the present antenna direction, there is a great probability that the channel environment is very similar to the present state.

Thus, the antenna switching control section 105 freezes the various feedback loops of the signal processing section 101 during the sync signal period, and switches the pattern of the antenna 100. Since no channel signal exists during the switching of the pattern of the antenna 100, the information on the sync signal period cannot be received. However, since the information on the sync signal period is the information thrown away by the FEC 101-4, the channel signal can be received even if the information of the field sync signal period is broken.

As described above, the antenna switching control section 105 controls the signal processing section 101 to receive the channel signal and controls various feedback loops in the signal processing section 101 to unfreeze. Accordingly, the pattern of the antenna 100 is switched without discontinuation of the received information.

And, if the of the antenna 100 to be switched is not similar to the present pattern of the antenna 100, the antenna switching control section 105 switches the pattern of the antenna 100 without waiting for the sync signal period.

That is, if the switching direction of the antenna 100 is not adjacent to the present direction of the antenna 100, there is a great probability that the channel environment is quite different from the present state, and thus the antenna switching control section 105 directly switches the pattern of the antenna 100 without waiting for the sync signal period.

If the channel environment corresponding to the switching direction is stored in the storage device 104, the antenna switching control section 105 unfreezes the signal processing section 101 using the stored channel information after the pattern of the antenna 100 is switched. Meanwhile, if the channel information is not stored in the storage device 104, the antenna switching control section 105 unfreezes the signal processing section 101 with an initialization value.

In other words, it is necessary to prevent the abnormal state of the signal processing section 101 and to minimize the time during which the signal processing section 101 reaches the normal state. If no channel information is stored, it takes a long time for the equalizer 101-3 to converge again, and this may cause the data in the signal processing section 101 to be broken. Accordingly, the signal processing section 101 is first initialized, and then the pattern of the antenna 100 is switched.

Figure 5A:
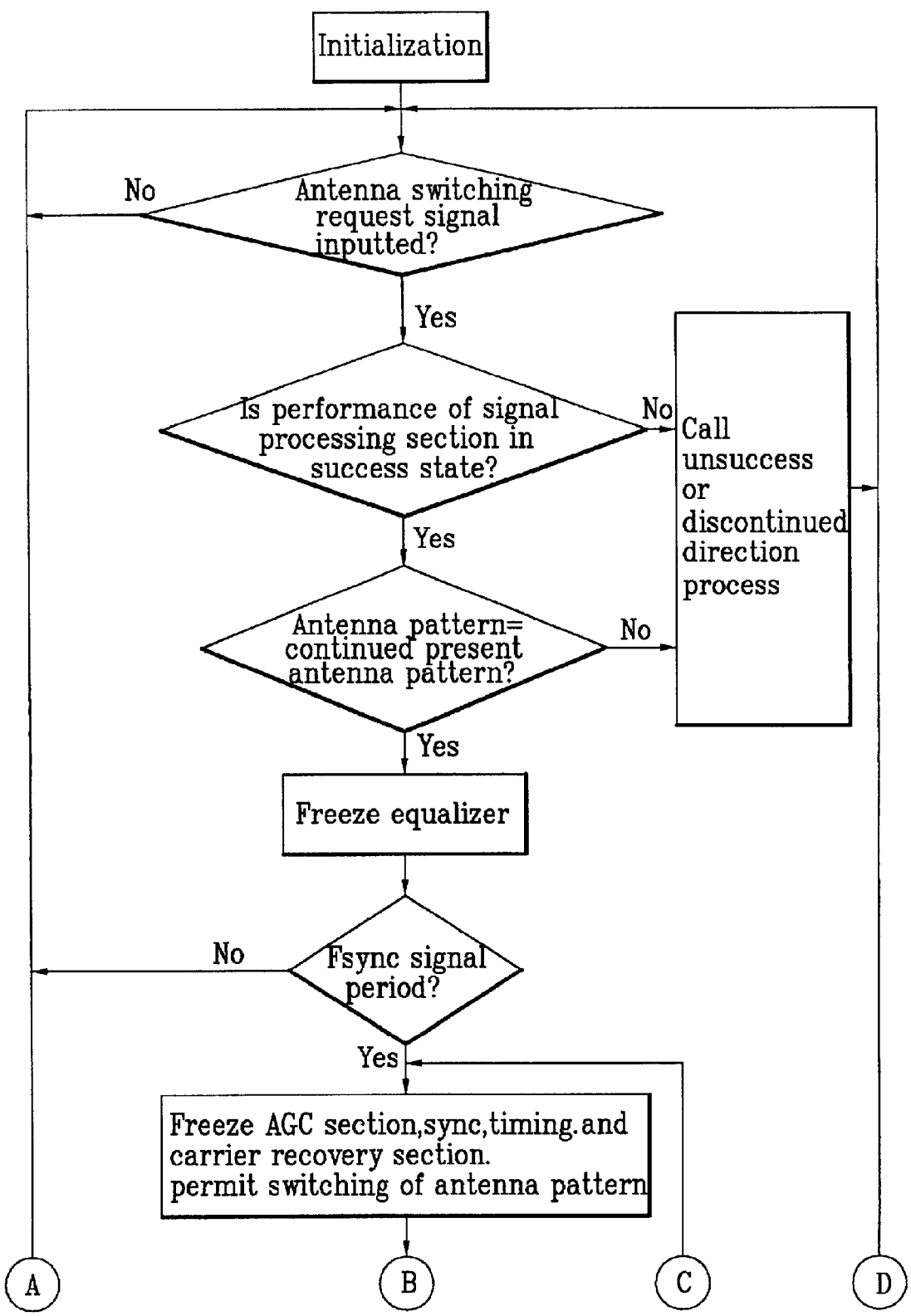
FIGS. 5A and 5B are flowcharts illustrating a process of switching an antenna according to the present invention.
Figure 5B:
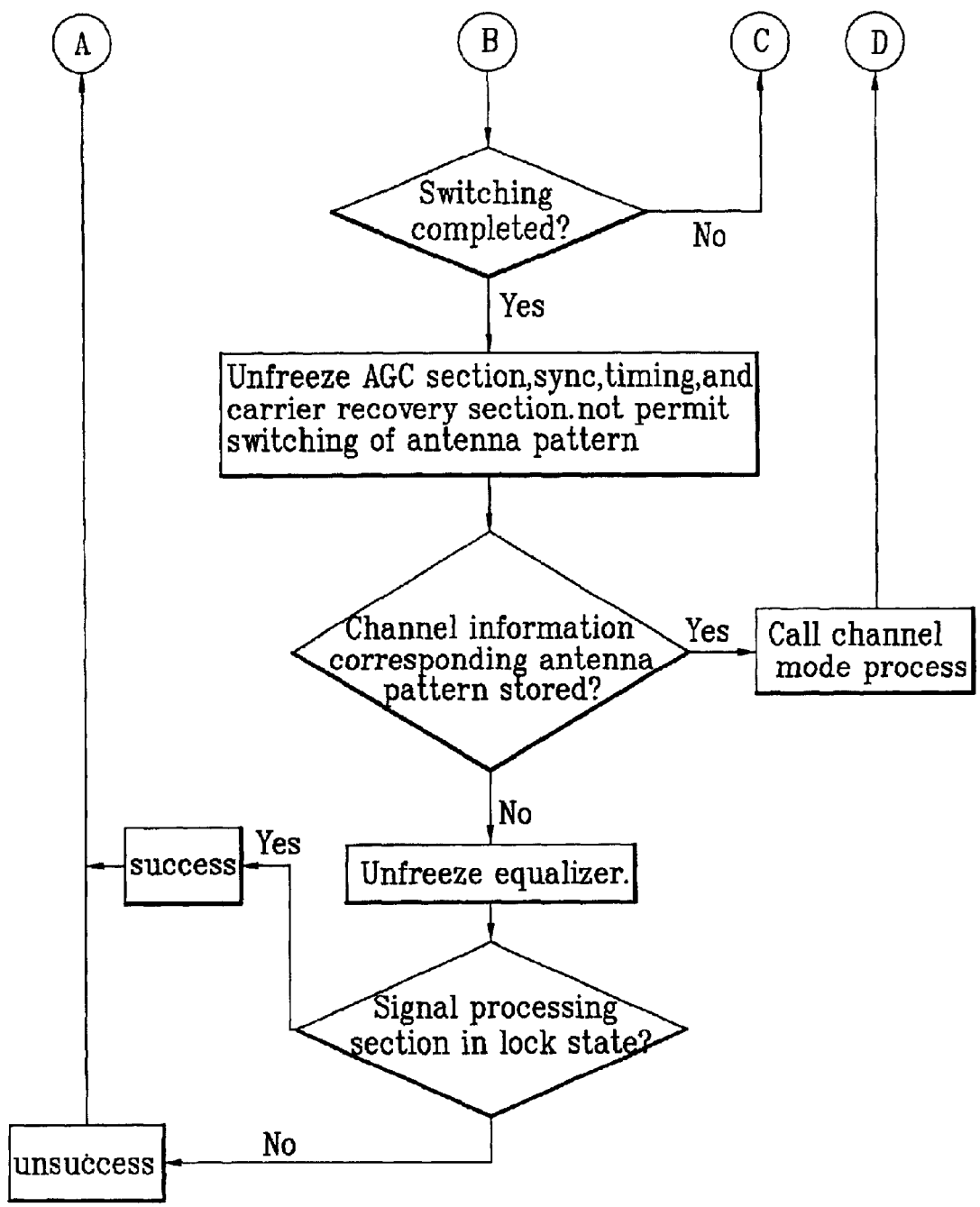

FIGS. 5A and 5B are flowcharts illustrating a process of switching an antenna according to the present invention.

Referring to FIGS. 5A and 5B, if the antenna switching request signal is inputted from the antenna control section 103, the antenna switching control section 105 judges whether the signal processing section 101 is in an unsuccess state caused by the unlock.

The system performance of the signal processing section 101 is divided into the success state and unsuccess state according to the SNR and so on of the channel signal outputted from the forward error corrector 101-4.

The antenna switching control section 105 performs the unsuccess or discontinued direction process if the signal processing section 101 is in unsuccess state or the antenna pattern to be switched is judged not to be similar to the present antenna pattern, i.e., if the switching direction of the antenna pattern is judged not to be adjacent to the present antenna direction.

On the contrary, if the signal processing section 101 is in the success state caused by the lock, and the antenna pattern is judged to be similar to the present antenna pattern, the antenna switching control section 105 freezes an error updating of the equalizer 101-3, and then waits for the sync signal period of the channel signal.

In the sync signal period, the antenna switching control section 105 freezes the error updating of the loops of AGC, sync restoration, symbol sync restoration, and carrier restoration of the signal processing section 101, and permits the switching of the pattern of the antenna 100. Then, the antenna switching control section 105 waits for the switching of the antenna pattern.

The reason why the equalizer 101-3 is first frozen is that the converging speed of the equalizer 101-3 is lower than a freeze converging speed of the loops of the AGC, sync restoration, symbol sync restoration, and carrier restoration. The reason why the equalizer 101-3 is first unfrozen is the same as above.

If it is judged that the switching of the antenna pattern is completed, the antenna switching control section 105 re-performs the error updating of the loops of the AGC, sync restoration, symbol sync restoration, and carrier restoration.

After the switching of the antenna pattern is performed as above, the antenna switching control section 105 confirms whether the channel information corresponding to the switched antenna pattern, that is, channel information on the antenna direction, is stored. If the channel information on the switched antenna direction is stored in the storage device 104, the antenna switching control section 105 performs the channel mode process.

If the channel information is not stored, the antenna switching control section 105 re-performs the error updating of the equalizer 101-3.

The antenna switching control section 105 confirms whether the signal processing section 101 is in the lock state, and if in the lock state, it indicates the success state, and if in the unlock state, it indicates the unsuccess state.

Then, the antenna switching control section 105 waits for the switching request signal from the antenna control section 103.

Figure 6A:
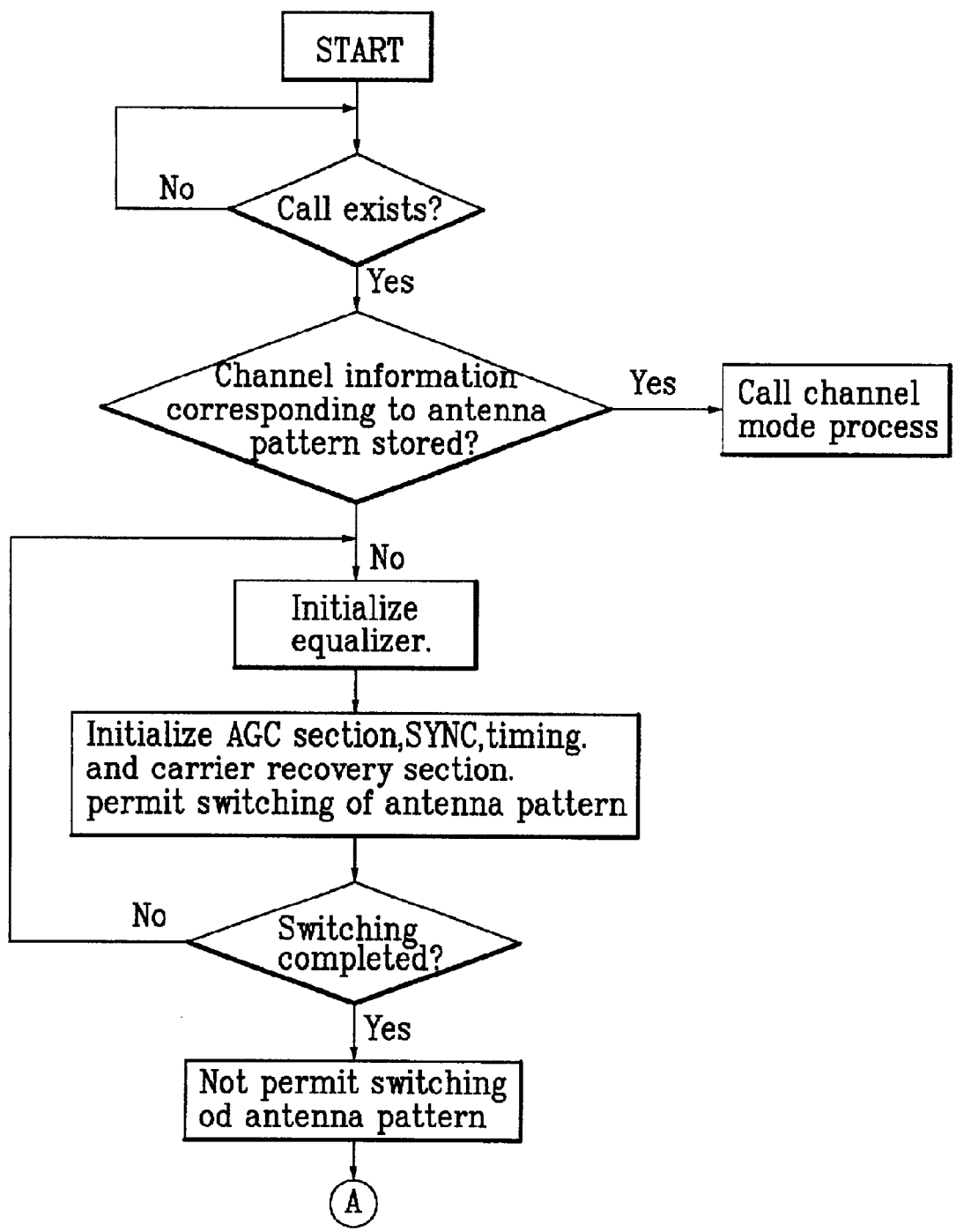
FIGS. 6A and 6B are flowcharts illustrating an unsuccess or discontinued direction process according to the present invention.
Figure 6B:
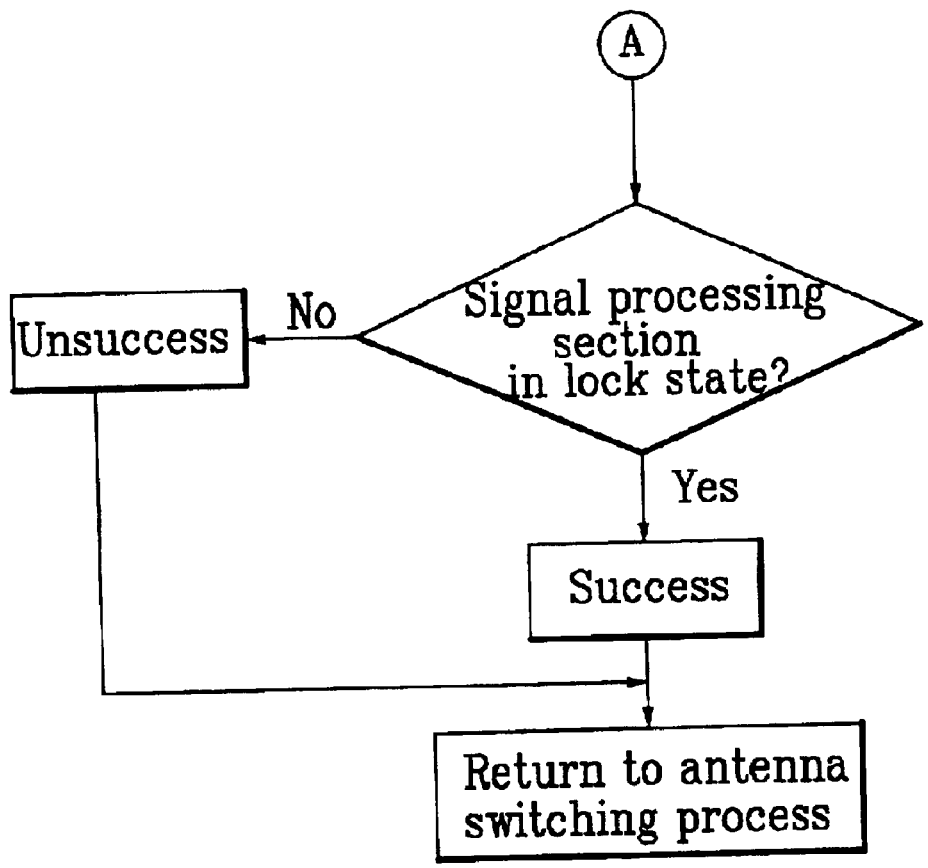

FIGS. 6A and 6B are flowcharts illustrating an unsuccess or discontinued direction process of the antenna switching control section.

First, the antenna switching control section 105 confirms whether the call request signal is inputted from the antenna switching process mode. If the call request signal is inputted, the antenna switching control section 105 starts the discontinued direction process.

The antenna switching control section 105 then judges whether the channel information is stored in the storage device 104, and if the channel information is stored, it performs the channel process.

If the channel information is not stored, the antenna switching control section 105 first initializes coefficients of the equalizer 101-3, and then initializes the loops of the AGC, sync restoration, symbol sync restoration, and carrier restoration. Thereafter, the antenna switching control section 105 permits the switching of the patterns of the antenna 100.

The reason why the equalizer 101-3 is first initialized is that the converging speed of the equalizer 101-3 is lower than the freeze converging speed of the loops of the AGC, sync restoration, symbol sync restoration, and carrier restoration.

Then, the antenna switching control section 105 confirms whether the switching of the antenna pattern is completed. If the switching is completed, it limits the re-switching of the patterns of the antenna 100.

Thereafter, the antenna switching control section 105 judges whether the signal processing section 101 is in the lock state according to the system performance of the signal processing section 101. If the signal processing section 101 is in the lock state, the antenna switching control section 105 indicates the success state, while if the signal processing section 101 is in the unlock state, it indicates the unsuccess state. Then, the antenna switching control section 105 returns to the antenna switching procedure.

Figure 7A:
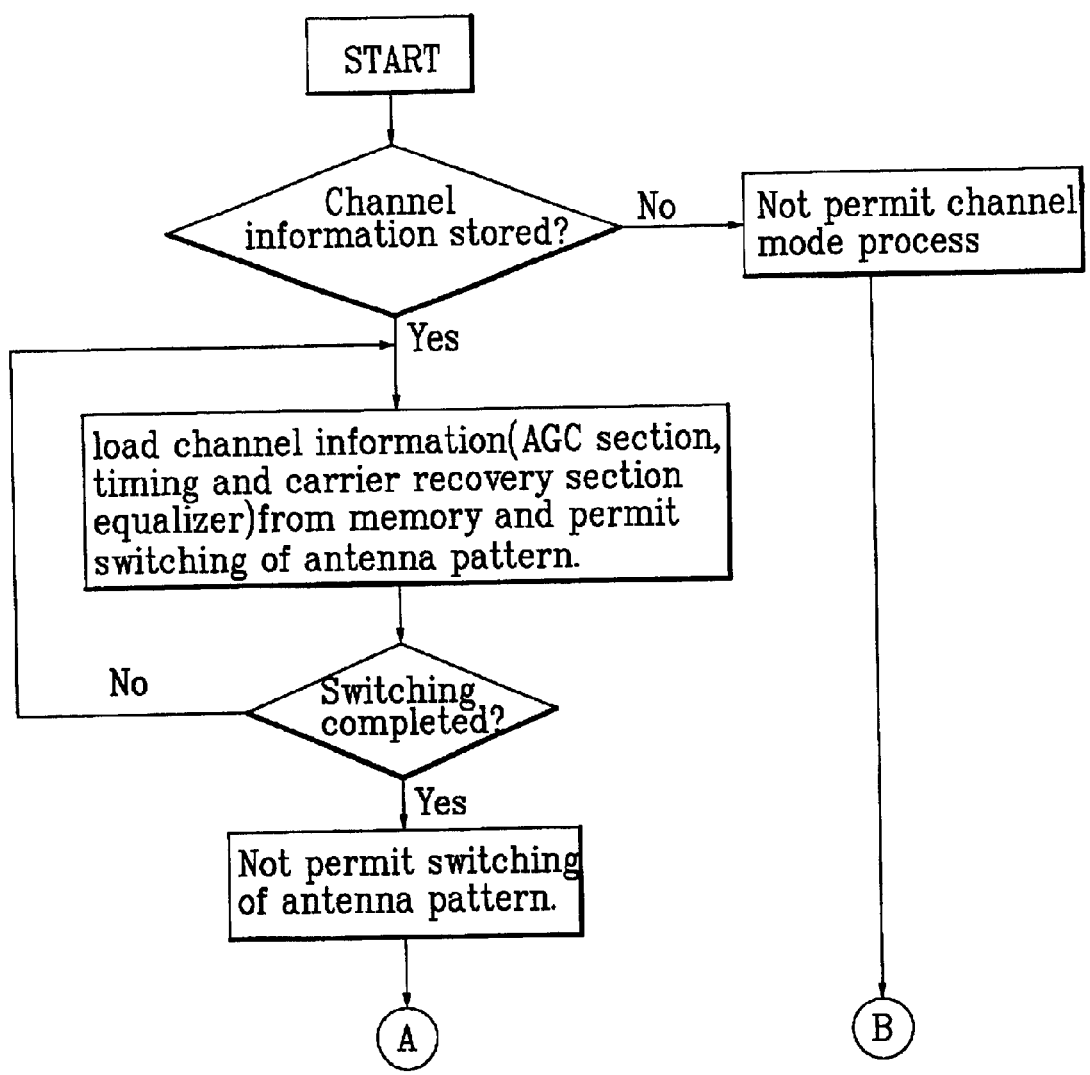
FIGS. 7A and 7B are flowcharts illustrating a channel mode process according to the present invention.
Figure 7B:
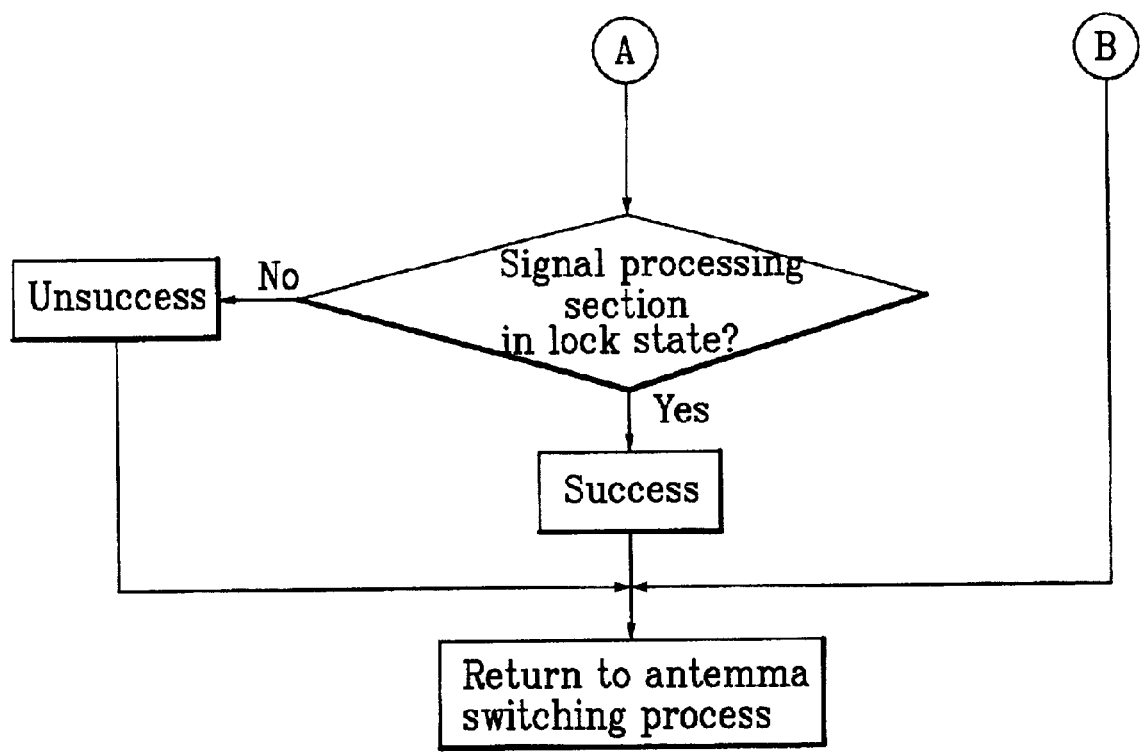

FIGS. 7A and 7B are flowcharts illustrating a channel mode process according to the present invention.

If the channel information is stored in the storage device 104 during the antenna switching process as shown in FIGS. 5A and 5B or the unsuccess or discontinued direction process as shown in FIGS. 6A and 6B, the antenna switching control section 105 can call the channel mode process.

First, the antenna switching control section 105 confirms whether the channel information is stored in the storage device 104. If the channel information is not stored, the antenna switching control section 105 disables the channel mode process, and returns to the antenna switching process.

If the channel information is stored, the antenna switching control section 105 read out the stored channel information from the storage device 104, sets up the coefficient information of the equalizer 101-3 along with the information of the loops of the AGC, sync restoration, symbol restoration, and carrier restoration, and then permits the switching of the antenna pattern.

The antenna switching control section 105 confirms whether the switching is completed. If the switching is completed, it limits the switching of the antenna pattern. Thereafter, the antenna switching control section 105 judges whether the signal processing section 105 is in the lock state according to the system performance of the signal processing section 101. If the system performance is in the lock state, the antenna switching control section 105 indicates the success state, while if the system performance is in the unlock state, it indicates the unsuccess state. Thereafter, the antenna switching control section 105 returns to the antenna switching process.

As described above, the digital television receiver and antenna control method in the digital television receiver according to the present invention have the following advantages.

First, since the switching of the antenna pattern is performed using the sync signal period of the received channel signal, the discontinuation of the received data can be prevented while the received signal does not exist. Accordingly, the stability of the digital television receiver is improved.

Second, since the channel information for switching the antenna pattern is stored and the digital television receiver is operated using the channel information, an abnormal state of the receiving system can be prevented, and further the time required for reaching the normal state of the receiving system can be minimized.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital television receiver comprising:
   a receiving section for receiving and processing a channel signal for digital television broadcasting through an antenna having a directivity in dependence upon a control signal for switching patterns of the antenna;
   an antenna control section for generating the control signal for switching the patterns of the antenna based on channel information according to the received channel signal; and
   an antenna switching control section for switching the patterns of the antenna during a sync signal period of the received channel signal if the control signal is generated.

2. The digital television receiver of claim 1, further comprising a storage device for storing the channel information for switching the patterns of the antenna.

3. The digital television receiver of claim 1, wherein the receiving section comprises:
   an automatic gain control section for tuning the desired channel signal among the broadcasting channel signals received through the antenna;
   a recovery section for recovering synchronization, timing, and carrier loss of an output signal of the automatic gain control section;
   an equalizer for equalizing an output signal of the recovery section; and
   a forward error corrector for correcting a forward error of an output signal of the equalizer.

4. The digital television receiver of claim 1, wherein the control signal is determined according at least one of a signal power, ghost power, and signal-to-noise ratio of the received channel signal.

5. The digital television receiver of claim 1, wherein the channel information for switching the patterns of the antenna is at least one of information on automatic gain control, sync signal restoration, symbol sync restoration, carrier restoration, and equalizer coefficient.

6. A digital television receiver comprising:
   an antenna having a directivity in dependence upon a control signal for receiving channel signals for digital television broadcasting, and switching patterns of the antenna;
   a signal processing section for tuning the desired channel signal among the broadcasting channel signals, and obtaining a sync signal, channel information for switching the patterns of the antenna, and audio and video signals for display by processing the tuned channel signal;
   an antenna control section for generating a control signal for switching the patterns of the antenna according to the channel information; and
   an antenna switching control section for switching the patterns of the antenna during a sync signal period of the tuned channel signal in response to an antenna-switching-related signal provided from the antenna control section when the control signal is generated.

7. The digital television receiver of claim 6, wherein the antenna-switching-related signal includes a switching request signal for requesting switching of the antenna patterns according to the channel information, pattern information of the antenna, and system performance signal of the signal processing section.

8. The digital television receiver of claim 6, wherein if the pattern information of the antenna is similar to the present pattern of the antenna, the antenna switching control section provides a freeze signal to the signal processing section during switching of the patterns of the antenna, and after the switching, provides an unfreeze signal to the signal processing section.

9. The digital television receiver of claim 6, wherein the antenna switching control section provides an antenna switching enable signal to the antenna control section during the sync signal period.

10. The digital television receiver of claim 6, wherein the sync signal is a field sync signal generated for each field of the channel signal.

11. An antenna control method in a digital television receiver having a signal processing section provided with a direction-adjustable antenna and an equalizer, and an antenna control section for generating a control signal for controlling patterns of an antenna, the method comprising the steps of:

(a) receiving a channel signal through the antenna as rotating the antenna;

(b) storing in a storage device the pattern of the antenna and channel information corresponding to the pattern of the antenna when the channel signal is received; and (c) switching the pattern of the antenna during a sync signal period of the channel signal if an antenna switching request is received from the antenna control section.

12. The method of claim 11, where in the step (c) comprises the steps of:

(d) confirming whether the antenna switching request signal is generated from the antenna switching section;

(e) if the signal processing section is not in a lock state, or the pattern of the antenna to be switched is not similar to the present pattern of the antenna, performing a unsuccess or discontinued direction process;

(f) if the signal processing section is in the lock state, and the pattern of the antenna to be switched is similar to the present pattern of the antenna, switching the pattern of the antenna during the sync period of the channel signal;

(g) if the switching of the antenna pattern is completed, and the channel information corresponding to the switched antenna pattern is stored in the storage device, performing a channel mode process; and (h) if the switching of the antenna pattern is completed, and the channel information corresponding to the switched antenna pattern is not stored in the storage device, returning to the step (d).

13. The method of claim 12, wherein the channel mode process comprises the steps of:

performing the step (d) if the channel information corresponding to the antenna pattern to be switched is not stored in the storage device, while setting up the channel information to the signal processing section, and permitting the switching of the antenna pattern if the channel information corresponding to the antenna pattern to be switched is stored in the storage device, and if the switching is completed, limiting another switching of the antenna pattern; and indicating a success state if the signal processing section is in the lock state, while indicating an unsuccess state if the signal processing section is not in the lock state, and performing the step (d).

14. The method of claim 12, wherein the step (f) comprises the steps of:

if the signal processing section is in the lock state and the pattern of the antenna to be switched is similar to the present pattern of the antenna, freezing an equalizer of the signal processing section and waiting for the sync signal period; and if the sync signal period has come, freezing the signal processing section except for the equalizer, and switching the present pattern of the antenna to the pattern of the antenna to be switched.

15. The method of claim 12, wherein the step (g) comprises the steps of:

if the switching is completed, unfreezing other components of the signal processing section except for the equalizer;

if the channel information corresponding to the antenna pattern to be switched is stored, calling the channel mode process, while if the channel information corresponding to the antenna pattern to be switched is not stored, unfreezing the equalizer of the signal processing section; and confirming whether the signal processing section is locked, indicating a success state if the signal processing section is in the lock state, while indicating an unsuccess state if the signal processing section is not in the lock state, and then performing the step (d).

16. The method of claim 12, wherein the unsuccess or discontinued direction process comprises the steps of:

if the channel information corresponding to the antenna pattern to be switched is stored in the storage device, calling the channel mode process;

if the channel information corresponding to the antenna pattern to be switched is not stored, initializing the signal processing section, switching the antenna pattern to the antenna pattern to be switched, and limiting another switching of the antenna pattern if the switching is completed; and if the signal processing section is in the lock state, indicating the success state, while if the signal processing section is not in the lock state, indicating the unsuccess state.

17. The method of claim 16, wherein the channel mode process comprises the steps of:

performing the step (d) if the channel information corresponding to the antenna pattern to be switched is not stored in the storage device, while setting up the channel information to the signal processing section, and permitting the switching of the antenna pattern if the channel information corresponding to the antenna pattern to be switched is stored in the storage device, and if the switching is completed, limiting another switching of the antenna pattern; and indicating the success state if the signal processing section is in the lock state, while indicating the unsuccess state if the signal processing section is not in the lock state, and performing the step (d).

* * * * *